United States Patent Office 3,007,806
Patented Nov. 7, 1961

3,007,806
HIGH SILICA REFRACTORY WOOLS
Frederick J. Hartwig, Alliance, Ohio, assignor to The Babcock & Wilcox Company, New York, N.Y., a corporation of New Jersey
No Drawing. Filed Dec. 30, 1957, Ser. No. 705,775
5 Claims. (Cl. 106—50)

This invention relates to the formation of refractory wool fibers having good high temperature use properties and, more particularly, to a mineral or "glass" wool fiber having high temperature properties approaching those of pure silica.

Fibers of this type are some times referred to as "glass fibers" inasmuch as they have properties substantially similar to those of known glasses, although so-called "mineral wool" fibers have a higher use temperature range than do fibers of ordinary glass.

A glass fiber has more strength and resilience than a crystalline fiber, in general, and to maintain this strength and resilience at high use temperatures it must neither deform physically to a different shape nor devitrify into a crystalline material. It is known from the manufacture of glass and mineral fibers that the factor which causes deformation of such fibers is surface tension, and the factor which causes them to devitrify is the reaction promoting crystallization. Technically, glasses are classified as subcooled liquids and the property of glasses which resists these factors is the viscosity.

Variations or changes in these three properties of glass are caused by variation in the composition of the glass. Common glass deforms substantially at around 1200 degrees F., and thus its use temperature limit is considered to be approximately 1000 degrees F. or less. On the other hand, fibers made of kaolin, which is a known type of clay, have a viscosity which is too high at 2000 degrees F. to allow the fibers to deform more than a very small extent. However, kaolin contains both alumina and silica and these two substances have a strong tendency to form mullite, which is a crystalline composition comprising three parts of alumina and two parts of silica. This tendency to crystallize is so strong that it will overcome the viscosity of the fibers and effect crystallization in two or three seconds at 2000 degrees F., in eight (8) seconds at 1900 degrees F. and in nineteen (19) seconds at 1800 degrees F. After the alumina and silica have formed mullite crystals, there is still silica remaining in the kaolin due to the fact that the initial composition contains an excess of silica above the theoretical mullite ratio. This excess silica remains in a glassy form and comprises about 64 percent by weight of kaolin fibers.

As the viscosity reducing action of the alumina has been terminated by reaction of all the alumina with a part of the silica to form fine mullite crystals, the viscosity of the kaolin fibers approaches that of pure silica. In addition, the fine mullite crystals increase the apparent viscosity of the silica glass. At this stage, the kaolin wool fibers, although partly crystallized, are so viscous that, at 2000 degrees F., they will not crystallize further for at least six (6) months or longer. Consequently, mineral wool formed from kaolin can be termed a mineral wool having good high temperature properties.

Pure silica wool acts in a somewhat similar manner in that, at 2000 degrees F., it has a very high viscosity and the crystallizing tendency of cristobalite, which is crystalline silica, is weaker than that of mullite but still strong enough so that cristobalite crystals will form. However, as distinguished from the formation of mullite crystals in kaolin wool fibers, the formation of cristobalite crystals takes a much longer time, measured in hours rather than in seconds, at any given high temperature. After enough cristobalite has formed to increase the apparent viscosity, the devitrification stops and there is no further change. Thus, pure silica wool is also a mineral wool having good high temperature use properties.

Silica is the only presently known material having a high enough viscosity at high temperatures to make a relatively stable glassy fiber. While glasses formed from $B_2O_3$ and $P_2O_5$ are quite viscous and will stand up at low temperatures, above 1500 degrees F. only silica will stand up in the form of elongated glassy fibers. One measurement of the viscosity of silica at 2200 degrees F. has been given as 10 trillion poises, and while this measurement may not be absolutely accurate, it provides an idea of the viscosity needed to resist devitrifying and surface tension forces in fine glassy fibers.

However, the formation of long monofilaments from silica is expensive and difficult. Such fibers cannot be made from pure silica, in a practical manner, by either blowing or drawing from molten silica because, even at 3500 degrees F., the silica remains too viscous to be handled. As a matter of fact, the viscosity of silica at this temperature is of the order of 600,000 poises, while a viscosity of 1000 poises or less is considered suitable for practical production of fine fibers.

Pure silica fibers have been made by first forming fibers of required diameters and fineness from a molten composition containing silica and other materials, and then the other materials are leached out of the fibers by chemical action. However, this procedure makes the fibers porous and dusty and the strength is reduced to only a minor fraction of the original strength of the fibers. In addition, the procedure is complicated and expensive.

In accordance with the present invention, it has been discovered that glass fibers having high temperature use properties approaching those of pure silica can be formed by drawing or blowing fibers from a molten mixture containing from 70 to 95 percent silica by weight with the balance being one other substance or modifier. For example, the molten composition may comprise 70 to 95 percent silica with the balance being alumina. In addition, other modifying agents such as lime or titania may be substituted for the alumina.

Before proceeding to a detailed description of the method of the present invention, it will be helpful to briefly review some factors which must be considered in the formation of glass or mineral wool fibers. At a viscosity of three (3) poises, a monofilament cannot be drawn as surface tension forces pull the molten material into drops before the fiber can be elongated by known procedures such as drawing. From the experience obtained in the manufacture of ordinary glass fibers, it is known that a viscosity of from 100 to 1000 poises is needed to permit the drawing of glass or mineral fibers.

In accordance with the invention, the viscosity of pure silica at high temperatures can be reduced to almost any desired degree by the adding of a modifier. For example, the addition of approximately 45% alumina to silica will form a synthetic kaolin and reduce the viscosity at 3500 F. from 600,000 poises to one or two poises. Similarly, the addition of 10% alumina to silica will give a melt with a viscosity of about 1000 poises at 3300 F. to 3500 F. Silica is neutral, or very slightly acid, and as a general rule the more basic the material added to the silica the faster the viscosity will drop, or, as a corrolary, a lesser amount of such basic material will be needed to drop the viscosity of the two-part mixture to a value such as to permit the drawing of fibers. On this basis $Li_2O$, $Na_2O$ or $K_2O$ could be added in the smallest amounts to give the desired viscosity. However, an examination of the phase diagrams of these materials in combination with silica will indicate that there is liquid present above 1400 degrees F. or 1500 degrees F. in these systems, and the presence of this liquid will destroy the high temperature properties. Consequently, magnesia and lime, which are less basic materials, and exhibit no liquid phase below 2800 degrees F. when mixed with silica, are more suitable modifiers for the silica where it is desired to retain the high temperature use properties. When more neutral materials, such as alumina, titania, $Cr_2O_3$, $Zr_2O_3$ are mixed with silica, there is no liquid phase until even higher temperatures are reached.

The composition from which the fibers of the present invention are drawn may be made up in any desired manner. Thus, for example, a mixture of pure silica and pure alumina in the proportions of from 70 to 95 percent silica by weight and from 5 to 30 percent alumina by weight may be made. Similarly, pure silica in an amount of from 70 to 95 percent by weight may be mixed with pure lime in the amount of from 5 to 30 percent or pure titania in the amount of from 5 to 30 percent, all by weight.

However, a preferred starting material is kaolin clay which contains silica and alumina. To this clay there is added sufficient silica, in the form of sand or in the form of pure silica, to increase the silica percentage to from 70 to 95 percent, and preferably 90 percent, by weight. This mixture is then finely intermixed and melted in a high temperature crucible from which a stream of the molten mixture is tapped through a tapping nozzle such as known and used in the glass fiber drawing art. The monofilament issuing from the tapping nozzle is wound up on a reel or drum or the like with the winding being continued until substantially all of the melt has been tapped from the crucible. This provides an elongated monofilament containing from 70 to 95 percent silica, and preferably 90 percent, by weight, which will not deform nor devitrify into a crystalline material even when subjected to temperatures up to 2000 degrees F.

In a specific example, a mixture of 90 percent silica and 10 percent alumina was melted in an induction heated crucible and an 8000 foot continuous monofilament was drawn through a tapping nozzle generally patterned after glass drawing nozzles. The drawing speed varied from 1000 to 4000 f.p.m. and the fiber diameter was of the order of 20 microns.

As another specific example, fibers having a diameter of six (6) microns were formed at a drawing speed of 8000 f.p.m. with the melt of 90 percent silica and 10 percent alumina maintained at a temperature of from 3450 degrees F. to 3600 degrees F.

The average of a number of determination of Youngs modulus on fibers from 10 to 30 microns in diameter was $8 \times 10^6$ p.s.i.

Continuous monofilaments have also been drawn from molten mixtures containing 90 percent silica and 10 percent titania.

Fibers having the composition of the invention have also been made by directing a jet of air or gas at the issuing stream of molten material, these fibers being somewhat coarser and, of course, much shorter in length.

The fibers produced by the present invention are particularly adapted for high temperature uses above 2000 degrees F. For example, the longer fibers can be woven into cloth for fabrication into safety clothing, insulation covers, theater curtains or the like. They can also be used as threads for quilting and thus reinforcing high temperature insulation blankets. A further use of the fibers is for the coarser fractions needed in mineral wool filters. They are also adaptable to lower temperature uses, for example, for reinforcement of metals such as aluminum or the reinforcement of plastics which are to be used at temperatures of 500 F. to 1000 F.

While specific embodiments of the invention have been shown and described in detail to illustrate the application of the invention principles, it will be understood that the invention may be embodied otherwise without departing from such principles.

I claim:

1. A continuous monofilament homogeneous glassy fiber having a temperature use limit above 1500 F. and having a viscosity substantially identical with that of pure silica at a temperature approximating 2000 F. and consisting of 70–95% by weight of silica and 5–30% by weight of a viscosity-reducing modifier selected from the group consisting of MgO, CaO, $Al_2O_3$, $TiO_2$, $Cr_2O_3$, and $ZrO_2$ and forming with silica a mixture having a melting temperature above 2800 F. when in a crystalline form.

2. A continuous monofilament homogeneous glassy fiber having a temperature use limit above 1500 F. and having a viscosity substantially identical with that of pure silica at a temperature approximating 2000 F. and consisting of approximately 90% by weight of silica and 10% by weight of a viscosity-reducing modifier selected from the group consisting of MgO, CaO, $Al_2D_3$, $TiO_2$, $Cr_2O_3$, and $ZrO_2$ and forming with silica a mixture having a melting temperature above 2800 F. when in a crystalline form.

3. A continuous monofilament homogeneous glassy fiber having a temperature use limit above 1500 F. and having a viscosity substantially identical with that of pure silica at a temperature approximating 2000 F. and consisting of 70–95% by weight of silica and 5–30% by weight of a viscosity-reducing modifier selected from the group consisting of MgO, CaO, $Al_2O_3$, $TiO_2$, $Cr_2O_3$, and $ZrO_2$ and forming with silica a mixture having a melting temperature above 2800 F. when in a crystalline form and a viscosity between 100 and 1000 poises when molten.

4. The method of making a continuous monofilament homogeneous glassy fiber having a temperature use limit above 1500 F. which comprises heating a mixture consisting of 70–95% by weight of silica and 5–30% by weight of a viscosity-reducing modifier selected from the group consisting of MgO, CaO, $Al_2O_3$, $TiO_2$, $Cr_2O_3$, and $ZrO_2$ to a temperature above the melting point of the mixture and at which the viscosity of the molten mixture will be between 100 and 1000 poises, and while the mixture is at such a temperature and viscosity, continuously drawing a fiber therefrom.

5. The method of making a continuous monofilament homogeneous glassy fiber having a temperature use limit above 1500 F. which comprises heating a mixture consisting of approximately 90% by weight of silica and 10% by weight of a viscosity-reducing modifier selected from the group consisting of MgO, CaO, $Al_2O_3$, $TiO_2$, $Cr_2O_3$, and $ZrO_2$ to a temperature above the melting point of the mixture and at which the viscosity of the molten mixture will be between 100 and 1000 poises, and while the mixture is at such a temperature and viscosity, continuously drawing a fiber therefrom.

References Cited in the file of this patent

UNITED STATES PATENTS

| | | |
|---|---|---|
| 2,143,022 | McClure | Jan. 10, 1939 |
| 2,152,994 | Hanlein et al. | Apr. 4, 1939 |
| 2,219,331 | Pirani et al. | Oct. 29, 1940 |
| 2,326,059 | Nordberg | Aug. 3, 1943 |
| 2,693,668 | Slayter | Nov. 9, 1954 |
| 2,770,922 | Fitzgerald et al. | Nov. 20, 1956 |
| 2,823,117 | Labino | Feb. 11, 1958 |
| 2,853,393 | Beck et al. | Sept. 23, 1958 |